(12) United States Patent
Lee et al.

(10) Patent No.: US 12,122,905 B2
(45) Date of Patent: Oct. 22, 2024

(54) POLYOLEFIN-POLYSTYRENE MULTI-BLOCK COPOLYMER AND METHOD FOR PRODUCING SAME

(71) Applicant: LG Chem, Ltd., Seoul (KR)

(72) Inventors: Hyun Mo Lee, Daejeon (KR); Seok Pil Sa, Daejeon (KR); Seul Ki Im, Daejeon (KR); Ji Hyun Park, Daejeon (KR); Yun Kon Kim, Daejeon (KR); Ki Soo Lee, Daejeon (KR); Eun Ji Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 637 days.

(21) Appl. No.: 17/601,577

(22) PCT Filed: May 15, 2020

(86) PCT No.: PCT/KR2020/006455
§ 371 (c)(1),
(2) Date: Oct. 5, 2021

(87) PCT Pub. No.: WO2020/235892
PCT Pub. Date: Nov. 26, 2020

(65) Prior Publication Data
US 2022/0204747 A1 Jun. 30, 2022

(30) Foreign Application Priority Data

May 17, 2019 (KR) .......................... 10-2019-0058295
Sep. 30, 2019 (KR) .......................... 10-2019-0121191

(51) Int. Cl.
| | | |
|---|---|---|
| *C08L 53/00* | (2006.01) | |
| *C08F 210/14* | (2006.01) | |
| *C08F 210/16* | (2006.01) | |
| *C08F 212/08* | (2006.01) | |
| *C08F 297/02* | (2006.01) | |

(52) U.S. Cl.
CPC ............ *C08L 53/00* (2013.01); *C08F 210/14* (2013.01); *C08F 212/08* (2013.01); *C08F 297/02* (2013.01); *C08F 210/16* (2013.01)

(58) Field of Classification Search
CPC .. C08F 295/00; C08F 293/00; C08F 293/005; C08F 297/00–086; C08F 299/00–08; C08F 212/08; C08F 210/00–16; C08L 53/00–025
See application file for complete search history.

(56) References Cited

U.S. PATENT DOCUMENTS

| | | | |
|---|---|---|---|
| 6,235,855 B1 | 5/2001 | Arai et al. | |
| 2003/0191241 A1 | 10/2003 | Fujiwara et al. | |
| 2006/0199909 A1 | 9/2006 | Toyoda et al. | |
| 2006/0211819 A1 | 9/2006 | Hoenig et al. | |
| 2007/0100060 A1 | 5/2007 | Tahri et al. | |
| 2008/0176969 A1 | 7/2008 | Tahri et al. | |
| 2008/0319130 A1 | 12/2008 | Chang | |
| 2011/0032621 A1 | 2/2011 | Marchand et al. | |
| 2013/0296517 A1 | 11/2013 | Noh et al. | |
| 2014/0011974 A1 | 1/2014 | Noh et al. | |
| 2016/0168304 A1 | 6/2016 | Noh et al. | |
| 2016/0230000 A1 | 8/2016 | Gu | |
| 2016/0333124 A1 | 11/2016 | Sung et al. | |
| 2017/0037174 A1 | 2/2017 | Arai et al. | |
| 2018/0022852 A1 | 1/2018 | Lee et al. | |
| 2020/0031978 A1 | 1/2020 | Lee et al. | |
| 2022/0177634 A1 | 6/2022 | Im et al. | |
| 2022/0195101 A1 | 6/2022 | Park et al. | |
| 2022/0204747 A1 | 6/2022 | Lee et al. | |
| 2023/0116142 A1 | 4/2023 | Im et al. | |

FOREIGN PATENT DOCUMENTS

| | | |
|---|---|---|
| CN | 1473178 A | 2/2004 |
| CN | 1521194 A | 8/2004 |
| CN | 103502289 A | 1/2014 |
| CN | 103502290 A | 1/2014 |
| CN | 107406474 A | 11/2017 |
| JP | H10060051 A | 3/1998 |
| JP | 2006307176 A | 11/2006 |
| JP | 2009521581 A | 6/2009 |
| JP | 5133250 B2 | 1/2013 |
| JP | 5227162 B2 | 7/2013 |
| JP | 2020512470 A | 4/2020 |
| KR | 20100134571 A | 12/2010 |
| KR | 20160077642 A | 7/2016 |
| KR | 20160098968 A | 8/2016 |
| KR | 101657925 B1 | 9/2016 |

(Continued)

OTHER PUBLICATIONS

International Search Report for PCT/KR2020/006448 mailed Aug. 26, 2020; 3 pages.
Kim CS, Park SS, Kim SD, Kwon SJ, Baek JW, Lee BY. Polystyrene chain growth from di-end-functional polyolefins for polystyrene-polyolefin-polystyrene block copolymers. Polymers. Oct. 2017;9(10):481.
Li R, Zhang X, Zhou L, Dong J, Wang D. In situ compatibilization of polypropylene/polystyrene blend by controlled degradation and reactive extrusion. Journal of applied polymer science. Jan. 15, 2009;111(2):826-32.

(Continued)

*Primary Examiner* — Kregg T Brooks
(74) *Attorney, Agent, or Firm* — Lerner David LLP

(57) ABSTRACT

A polyolefin-polystyrene multi-block copolymer and a method of producing the same is disclosed herein. In some embodiments, the polyolefin-polystyrene multi-block copolymer has a first complex viscosity of 40,000 Pa·s to 350,000 Pa·s at a temperature of 160° C. and a first frequency of 0.5 rad/s, and has a second complex viscosity of 900 Pa·s to 3,500 Pa·s at a temperature of 160° C. and a second frequency of 125 rad/s. The polyolefin-polystyrene multi-block copolymer has a structure in which polystyrene chains are attached to both ends of a polyolefin chain.

5 Claims, 5 Drawing Sheets

(56) References Cited

FOREIGN PATENT DOCUMENTS

| KR | 101732418 B1 | 5/2017 |
|----|--------------|--------|
| KR | 101747396 B1 | 6/2017 |
| KR | 101848781 B1 | 4/2018 |
| WO | 2018182174 A1 | 10/2018 |

OTHER PUBLICATIONS

Zheng CJ, Yang JM, Zhao H, Chen QC. AC performance, physical and mechanical properties of polypropylene/polyolefin elastomers blends. In2018 12th International Conference on the Properties and Applications of Dielectric Materials (ICPADM) May 2, 20180 (pp. 910-913). IEEE.

International Search Report for Application No. PCT/KR2020/006436 mailed Aug. 21, 2020, 3 pages.

International Search Report for Application No. PCT/KR2020/006455 dated Aug. 24, 2020, 3pgs.

Extended European Search Report for Application No. 20809208.0 dated May 10, 2022. 7 pgs.

Extended European Search Report for Application No. 20810243.4 dated May 10, 2022. 7 pgs.

Extended European Search Report for Application No. 20808843.5 dated May 10, 2022. 7 pgs.

POLYOLEFIN-POLYSTYRENE MULTI-BLOCK COPOLYMER AND METHOD FOR PRODUCING SAME

CROSS-REFERENCE TO RELATED APPLICATIONS

The present application is a national phase entry under 35 U.S.C. § 371 of International Application No. PCT/KR2020/006455, filed on May 15, 2020, which claims priority from Korean Patent Application No. 10-2019-0058295, filed on May 17, 2019, and Korean Patent Application No. 10-2019-0121191, filed on Sep. 30, 2019, the disclosures of which are incorporated by reference herein.

TECHNICAL FIELD

The present invention relates to a polyolefin-polystyrene multi-block copolymer having a structure in which polystyrene chains are attached to both ends of a polyolefin chain, and a method for producing the same.

BACKGROUND ART

Research and development of block copolymers are being actively carried out as widely used materials in not only common plastics but also high-tech devices. In particular, styrene-olefin copolymer resins containing both a polyolefin (PO) block and a polystyrene (PS) block have excellent heat resistance, light resistance, elastic force, and the like, and thus are being useful in various arts.

Currently, the market with respect to polyolefin-polystyrene block copolymers, such as, Styrene-Ethylene-Butylene-Styrene (SEBS) or Styrene-Ethylene-Propylene-Styrene (SEPS) have been formed on a scale of several hundred thousand metric tons worldwide. A representative example of the styrene-olefin copolymer resins may include a polystyrene-block-poly(ethylene-co-1-butene)-block-polystyrene (SEBS) triblock copolymer. The SEBS triblock copolymer exhibits thermoplastic elastomer characteristics since the hard polystyrene domain in the structure thereof is separated from a soft poly(ethylene-co-1-butene) matrix and acts as a physical cross-linking site. According to these characteristics, the SEBS has been widely used in the group of products requiring rubbers, plastics, and the like, and the demand thereof is increasing greatly as the use range thereof is gradually increased.

Meanwhile, physical properties such as a melt viscosity and elastic modulus of the copolymer have a great influence on setting of extrusion processing conditions such as a film. In order to analyze physical properties of the copolymer, complex viscosity, storage modulus, and loss modulus in a molten state are measured and utilized.

Under the above background, there is a continuing need to produce a better product having a balance between physical properties and processability, and in particular, there is a further need for a polyolefin-polystyrene multi-block copolymer having excellent processability.

PRIOR ART DOCUMENTS

Patent Documents

Korean Patent No. 10-1657925

DISCLOSURE OF THE INVENTION

Technical Problem

An aspect of the present invention provides a polyolefin-polystyrene multi-block copolymer having a structure in which polystyrene chains are attached to both ends of a polyolefin chain, and more particularly, a polyolefin-polystyrene multi-block copolymer which has excellent processability and can be applied to various applications by exhibiting a low complex viscosity.

Technical Solution

According to an aspect of the present invention, there is provided a polyolefin-polystyrene multi-block copolymer satisfying conditions (a) and (b) below:
(a) a first complex viscosity ($\eta^*$) of 40,000 Pa·s to 350,000 Pa·s at a temperature of 160° C. and a first frequency ($\omega$) of 0.5 rad/s; and
(b) a second complex viscosity of 900 Pa·s to 3,500 Pa·s at a temperature of 160° C. and a second frequency of 125 rad/s.

Advantageous Effects

The polyolefin-polystyrene multi-block copolymer provided by the present invention has excellent processability, thereby being used in various industrial applications.

MODE FOR CARRYING OUT THE INVENTION

Figure 1A:
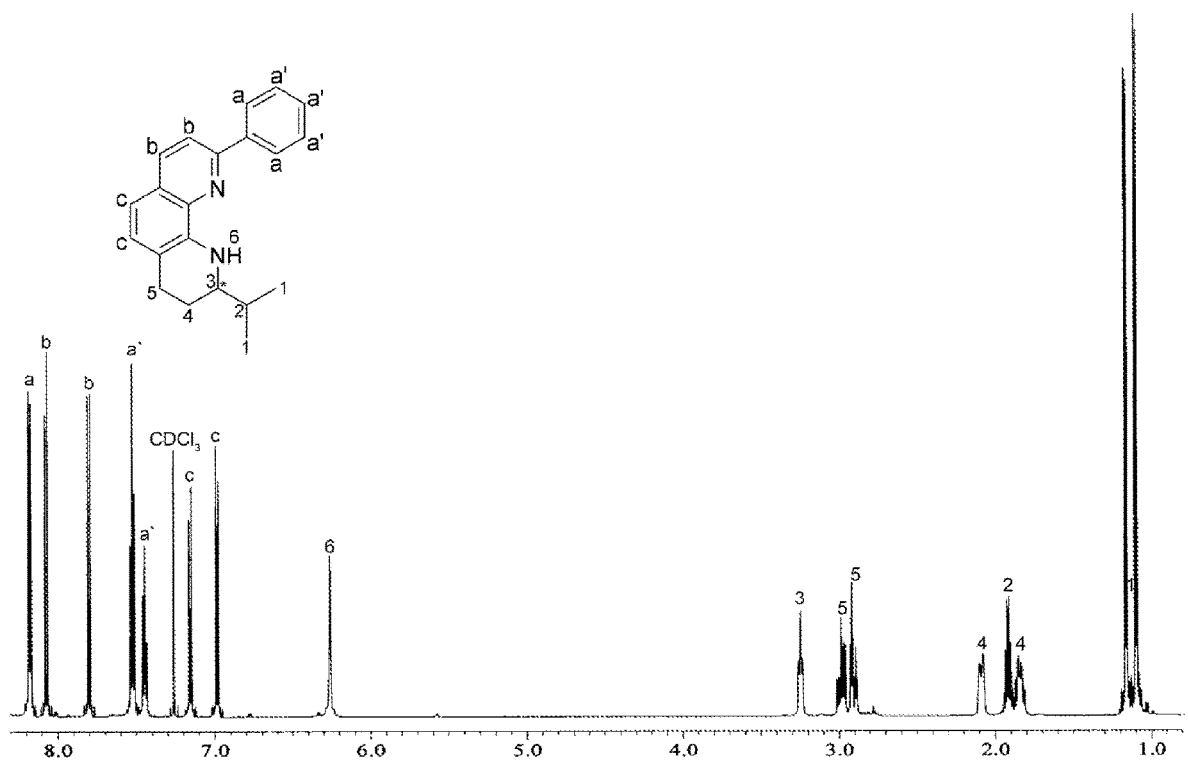
FIG. 1A shows an $^1$H NMR spectrum of a ligand compound according to an embodiment of the present invention.

Hereinafter, the present invention will be described in more detail to aid in understanding the present invention.

Terms or words used in the specification and claims should not be interpreted as being limited to a conventional or dictionary meaning, and should be interpreted as the meaning and concept that accord with the technical spirit on the grounds of the principle that the inventor can appropriately define the concept of the term in order to explain invention in the best way.

Polyolefin-Polystyrene Multi-Block Copolymer

The polyolefin-polystyrene multi-block copolymer of the present invention is characterized by satisfying conditions (a) and (b) below:
- (a) a first complex viscosity ($\eta^*$) of 40,000 Pa·s to 350,000 Pa·s at a temperature of 160° C. and a first frequency ($\omega$) of 0.5 rad/s; and
- (b) a second complex viscosity of 900 Pa·s to 3,500 Pa·s at a temperature of 160° C. and a second frequency of 125 rad/s.

The present inventors have studied for producing a polyolefin-polystyrene multi-block copolymer having excellent processability, and confirmed that a polyolefin-polystyrene multi-block copolymer exhibiting desired processability can be produced by using a novel transition metal compound as a catalyst to have a specific range of complex viscosity.

That is, the polyolefin-polystyrene multi-block copolymer of the present invention is produced by using a specific transition metal compound having a novel structure as a catalyst as described below, and is characterized by exhibiting excellent processability due to a low complex viscosity in a processing region, for example, a high frequency region.

A complex viscosity versus frequency graph can be measured by using, for example, Advanced Rheometric Expansion System (ARES). The frequency refers to an angular velocity applied to a complex solution, and a unit thereof is rad/s. The higher the frequency, the lower the viscosity of the complex solution, which is referred to as shear thinning. That is, the complex viscosity (Poise, y-axis) versus frequency (rad/s, x-axis) graph is related to fluidity, and it is expressed that the lower the slope of the complex viscosity versus the frequency, the lower the fluidity, and the higher the slope, the higher the fluidity.

The polyolefin-polystyrene multi-block copolymer of the present invention has a lower complex viscosity at a high frequency region, particularly, 120 rad/s to 500 rad/s, compared to a conventional polyolefin-polystyrene multi-block copolymer, and thus exhibits a large shear thinning behaviour, thereby exhibiting excellent fluidity and processability.

Particularly, the polyolefin-polystyrene multi-block copolymer of the present invention has a complex viscosity measured at a temperature of 160° C., and particularly, has a first complex viscosity of 40,000 Pa·s to 350,000 Pa·s at a first frequency of 0.5 rad/s, and a second complex viscosity of 900 Pa·s to 3,500 Pa·s at a second frequency of 125 rad/s. Particularly, the first complex viscosity at the first frequency of 0.5 rad/s may be 45,000 Pa·s to 300,000 Pa·s, and the second complex viscosity at the second frequency of 125 rad/s may be 1,000 Pa·s to 3,300 Pa·s, and more particularly, the first complex viscosity at the first frequency of 0.5 rad/s may be 46,000 Pa·s to 290,000 Pa·s, and the second complex viscosity at the second frequency of 125 rad/s may be 1,000 Pa·s to 3,200 Pa·s.

The complex viscosity (poise) versus the frequency (rad/s) is largely associated with the fluidity of the copolymer. The higher the slope of the complex viscosity versus each frequency, the higher the fluidity, which means that the processability of the copolymer is excellent. The correlation between the complex viscosity versus the frequency and the fluidity of the copolymer may be described through parameters such as MI 5 (@230° C.).

The weight average molecular weight of the polyolefin-polystyrene multi-block copolymer may be 50,000 g/mol to 150,000 g/mol, and particularly, 60,000 g/mol to 150,000 g/mol, or 70,000 g/mol to 120,000 g/mol, or 70,000 g/mol to 110,000 g/mol.

In addition, the molecular weight distribution of the polyolefin-polystyrene multi-block copolymer may be 1.5 to 3.0, and particularly, 1.6 to 2.5, 1.6 to 2.0, 1.5 to 2.5, 1.5 to 2.0, or 1.6 to 1.9.

The weight average molecular weight and number average molecular weight each are a polystyrene-conversion molecular weight analyzed by gel permeation chromatography (GPC), and the molecular weight distribution is calculated from the ratio of (weight average molecular weight)/(number average molecular weight).

The polyolefin-polystyrene multi-block copolymer may be at least one selected from the group consisting of a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer, and a polystyrene-poly(ethylene-co-1-octene)-polystyrene block copolymer.

In addition, the polyolefin block of the copolymer of the present invention may include at least one repeating unit represented by Formula a below:

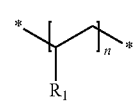

[Formula a]

In Formula a above,
$R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl,
n may be an integer of 1 to 10,000.

In addition, according to an embodiment of the present invention, $R_1$ above may be hydrogen or alkyl having 3 to 20 carbon atoms.

In addition, according to an embodiment of the present invention, $R_1$ above may be hydrogen or alkyl having 3 to 12 carbon atoms, and particularly, $R_1$ above may be hydrogen or alkyl having 4 to 12 carbon atoms.

In addition, n above may be an integer of 10 to 10,000, and particularly, an integer of 500 to 7,000.

Meanwhile, "*" in the formulae shown in the specification of the present invention represents a connecting part, which is a terminal part of a repeating unit.

When the polyolefin block includes at least two repeating units represented by Formula a above, the polyolefin block may include a repeating unit represented by Formula b below:

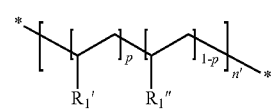

[Formula b]

In Formula b above,
$R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ above are different from each other, $0<p<1$, and n' may be an integer of 1 to 10,000.

In addition, according to an embodiment of the present invention, $R_1'$ and $R_1''$ above may be each independently hydrogen or alkyl having 3 to 20 carbon atoms, particularly may be each independently hydrogen or alkyl having 3 to 12 carbon atoms, and more particularly may be each independently hydrogen or alkyl having 4 to 12 carbon atoms.

In addition, particularly, n' may be an integer of 10 to 10,000, and more particularly, an integer of 500 to 7,000.

According to an embodiment of the present invention, in Formula b above, one among $R_1'$ and $R_1''$ may be hydrogen, and the other may be a substituent other than hydrogen among the above-mentioned substituents.

That is, when the polyolefin block includes at least two repeating units represented by Formula a above, a structure in which $R_1$ is hydrogen and a structure in which $R_1$ is alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl other than hydrogen may be randomly connected, and particularly, a structure in which $R_1$ is hydrogen and a structure in which $R_1$ is alkyl having 3 to 20 carbon atoms other than hydrogen may be randomly connected.

In addition, more particularly, the polyolefin block may be the one that a structure in which $R_1$ is hydrogen and a structure in which $R_1$ is alkyl having 3 to 12 carbon atoms in Formula a above are randomly connected, and still more particularly, the polyolefin block may be the one that a structure in which $R_1$ is hydrogen and a structure in which $R_1$ is alkyl having 4 to 12 carbon atoms in Formula a above are randomly connected.

When the polyolefin block includes at least two repeating units represented by Formula a above, the polyolefin block may include a structure in which $R_1$ is hydrogen and a structure in which $R_1$ is a substituent other than hydrogen in Formula a above, in a weight ratio of 30:90 to 70:10, particularly, in a weight ratio of 40:60 to 60:40, and more particularly in a weight ratio of 45:75 to 55:25.

When the polyolefin block includes a structure in which $R_1$ is hydrogen and a structure in which $R_1$ is a substituent other than hydrogen in the above-mentioned range, the prepared block copolymer includes a branch to an appropriate degree within the structure, and thus may have a high modulus value of 300% and an elongation at break to exhibit excellent elastic properties, and may exhibit a wide molecular weight distribution together with a high molecular weight to have excellent processability.

In addition, a first polystyrene block of the copolymer of the present invention may include at least one repeating unit represented by Formula c below:

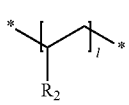

[Formula c]

In Formula c above, $R_2$ is aryl having 6 to 20 carbon atoms, or aryl having 6 to 20 carbon atoms which is substituted with halogen, alkyl having 1 to 12 carbon atoms, cycloalkyl having 3 to 12 carbon atoms, alkoxy having 1 to 8 carbon atoms, or aryl having 6 to 12 carbon atoms, l is independently an integer of 10 to 1,000.

$R_2$ above may be phenyl, or phenyl which is unsubstituted or substituted by halogen, alkyl having 1 to 8 carbon atoms, cycloalkyl having 3 to 12 carbon atoms, alkoxy having 1 to 8 carbon atoms, or aryl having 6 to 12 carbon atoms, and $R_2$ may be phenyl.

l above may be an integer of 10 to 1,000, and particularly an integer of 50 to 700, and when l is within the above range, the polyolefin-polystyrene block copolymer prepared by the production method of the present invention may have an appropriate level of viscosity.

In particular, the copolymer of the present invention may form a composite block represented by Formula d below which is formed by combining the polyolefin block including a repeating unit represented by Formula a above and the first polystyrene block including a repeating unit represented by Formula c above:

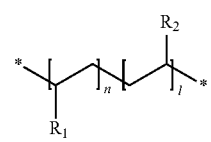

[Formula d]

In Formula d, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ is aryl having 6 to 20 carbon atoms, or aryl having 6 to 20 carbon atoms which is substituted with halogen, alkyl having 1 to 12 carbon atoms, cycloalkyl having 3 to 12 carbon atoms, alkoxy having 1 to 8 carbon atoms, or aryl having 6 to 12 carbon atoms, l is an integer of 10 to 1,000, and n is an integer of 1 to 10,000.

In addition, in Formula d above, each of $R_1$, $R_2$, l and n is the same as defined in Formula a and Formula c above.

In addition, when the polyolefin block includes the repeating unit represented by Formula a above, the composite block formed by combining the first polystyrene block including the repeating unit represented by Formula c above may be represented by Formula e below:

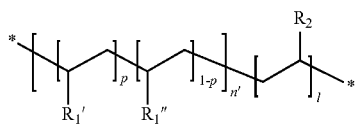

[Formula e]

In Formula e above, each of $R_1'$, $R_1''$, p, l and n' above is the same as defined in Formula a or c above.

In addition, when the copolymer of the present invention is prepared, a styrene monomer may form a polyolefin block, and together the styrene monomer may be bonded and polymerized to an organozinc compound to form a separate styrene polymer block. The separate styrene polymer block herein is referred to as a second polystyrene block. The second polystyrene block may include a repeating unit represented by Formula f below:

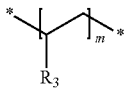

[Formula f]

In Formula f above, $R_3$ is aryl having 6 to 20 carbon atoms, or aryl having 6 to 20 carbon atoms which is substituted with halogen, alkyl having 1 to 12 carbon atoms, cycloalkyl having 3 to 12 carbon atoms, alkoxy having 1 to 8 carbon atoms, or aryl having 6 to 12 carbon atoms, and m is independently an integer of 10 to 1,000.

In addition, according to an embodiment of the present invention, $R_3$ above may be phenyl, or phenyl which is unsubstituted or substituted by halogen, alkyl having 1 to 8 carbon atoms, cycloalkyl having 3 to 12 carbon atoms, alkoxy having 1 to 8 carbon atoms, or aryl having 6 to 12 carbon atoms, and $R_3$ may be phenyl.

m above may be an integer of 10 to 1,000, and particularly, an integer of 50 to 700.

That is, the copolymer of the present invention may include the first polystyrene block including the repeating unit represented by Formula c above and the second polystyrene block including the repeating unit represented by Formula f above.

Accordingly, the block copolymer may include a triblock copolymer including the polyolefin block including at least one repeating unit represented by Formula a below; the first polystyrene block including the repeating unit represented by Formula c below; and the second polystyrene block including the repeating unit represented by Formula f below:

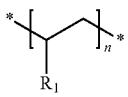

[Formula a]

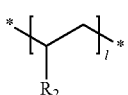

[Formula c]

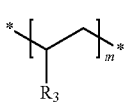

[Formula f]

In Formulae above, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ and $R_3$ are aryl having 6 to 20 carbon atoms, or aryl having 6 to 20 carbon atoms which is substituted with halogen, alkyl having 1 to 12 carbon atoms, cycloalkyl having 3 to 12 carbon atoms, alkoxy having 1 to 8 carbon atoms, or aryl having 6 to 12 carbon atoms, n is an integer of 10 to 10,000, and l and m are each independently an integer of 10 to 1,000.

Also, in Formulae above, $R_1$, $R_2$, $R_3$, n, l and m are the same as defined in Formulae a, c and f.

Method for Producing Polyolefin-Polystyrene Multi-Block Copolymer

A method for producing a polyolefin-polystyrene multi-block copolymer of the present invention is characterized by including the steps of: (S1) polymerizing olefin monomers using an organozinc compound as a chain transfer agent in the presence of a catalyst composition including a transition metal compound represented by Formula below to form a polyolefin block; and (S2) anionically polymerizing the polyolefin block with a styrene monomer in the presence of an alkyl lithium compound containing a silicon atom and a triamine compound to form a polystyrene block.

The production method of the present invention, as described below, forms a polyolefin chain by using a transition metal compound represented by Formula 1, which is efficiently utilized in the polymerization of olefin monomers, as a catalyst, and then continuously performs styrene anion-polymerization to form a polyolefin-polystyrene block, thereby forming a polyolefin-polystyrene multi-block copolymer having a specific height and a half-width of the tan δ peak.

Step (S1)

The step (S1) is a step of polymerizing olefin monomers using an organozinc compound as a chain transfer agent in the presence of a catalyst composition including a transition metal compound represented by Formula 1 below to form a polyolefin block:

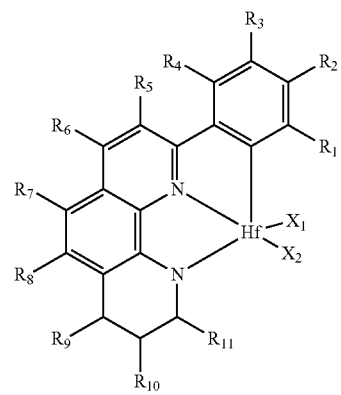

[Formula 1]

In Formula 1 above, $R_1$ to $R_{11}$ are each independently hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, Adjacent two or more among $R_1$ to $R_{11}$ may be bonded to form an aliphatic ring having 3 to 20 carbon atoms or an aromatic ring having 6 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio having 6 to 20 carbon atoms, an alkylsilyl group having 1 to 20 carbon atoms, or an arylsilyl group having 6 to 20 carbon atoms.

When a polymerization reaction is performed in the presence of an excess of a chain transfer agent (e.g., $(Et)_2Zn$) as compared with a catalyst, olefin polymer chains can be uniformly grown from dialkyl zinc by causing rapid alkyl exchange between zinc (Zn) and hafnium (Hf) to effect living polymerization, which is referred to as coordinative chain transfer polymerization (CCTP). Since conventional used metallocene catalysts have not been capable of living polymerization through a β-elimination process, a few catalysts known to be applicable to the CCTP have been only capable of single polymerization of ethylene, and it has been very difficult to perform copolymerization of ethylene and alpha-olefin through the CCTP, it has been very difficult to perform living polymerization through the CCTP using a general transition metal compound as a catalyst and prepare a block copolymer.

On the other hand, the hafnium compound represented by Formula 1 above is an $[N^{amido},N,C^{aryl}]HfMe_2$-type complex containing a 1,2,3,4-tetrahydro-1,10-phenanthroline backbone and a Hf—C(aryl) bond, which shows excellent alpha-olefin incorporation ability in the polymerization of ethylene and alpha-olefin, and in particular, the molecular weight of the olefin polymer or the content of the alpha-olefin varies depending on the content of the chain transfer agent, which indicates that the compound is successfully used in the CCTP and the β-removal reaction hardly occurred and seemed to be negligible. That is, the copolymerization of ethylene and an alpha-olefin monomer may be conducted by the CCTP using a hafnium compound represented by Formula 1 above to perform living polymerization, and the block copolymer having various block compositions may be successfully produced.

In addition, the CCTP using the hafnium compound may be converted into an anionic styrene polymerization reaction to synthesize a polyolefin-polystyrene block copolymer. As such, the hafnium compound may be usefully used as a catalyst for preparing an olefin polymer, which is a unique feature that may be achieved with a novel structure of the hafnium compound represented by Formula 1 above.

Particularly, in Formula 1 above, $R_1$ to $R_{11}$ above may be each independently hydrogen, an alkyl group having 1 to 20 carbon atoms, a cycloalkyl group having 3 to 20 carbon atoms, or an aryl group having 6 to 20 carbon atoms, preferably, $R_1$ to $R_{10}$ may be hydrogen, and together $R_{11}$ may be hydrogen, an alkyl group having 1 to 20 carbon atoms, or an aryl group having 6 to 20 carbon atoms, and more preferably, $R_1$ to $R_{10}$ are hydrogen, and together $R_{11}$ may be hydrogen or an alkyl group having 1 to 20 carbon atoms.

Alternatively, in Formula 1 above, $R_1$ to $R_{11}$ above may be each independently hydrogen, an alkyl group having 1 to 20 carbon atoms, or an aryl group having 6 to 20 carbon atoms, wherein $R_3$ and $R_4$ may be bonded to form an aromatic ring (e.g., a benzene ring) having 5 to 20 carbon atoms, and preferably $R_3$ and $R_4$ may be bonded to form a benzene ring and together $R_{11}$ may be an alkyl group having 1 to 20 carbon atoms, or an aryl group having 6 to 20 carbon atoms.

Alternatively, in Formula 1 above, $R_1$, $R_2$, and $R_5$ to $R_{10}$ above may be hydrogen, $R_3$, $R_4$, and $R_{11}$ above may be each independently hydrogen, or an alkyl group having 1 to 20 carbon atoms, and $R_3$ and $R_4$ above may be bonded to form an aromatic ring (e.g., a benzene ring) having 5 to 20 carbon atoms.

Meanwhile, $X_1$ and $X_2$ above may be each independently hydrogen, an alkyl group having 1 to 20 carbon atoms, a cycloalkyl group having 3 to 20 carbon atoms, or an aryl group having 6 to 20 carbon atoms, and preferably, each independently an alkyl group having 1 to 20 carbon atoms, and $X_1$ and $X_2$ above may be the same as each other.

As used herein, the term "alkyl" refers to a linear or branched hydrocarbon residue.

As used herein, the term "alkenyl" refers to a linear or branched alkenyl group.

As used herein, the term "aryl" is preferably an aryl group having 6 to 20 carbon atoms, and particularly, may include, but is not limited to, phenyl, naphthyl, anthracenyl, pyridyl, dimethylanilinyl, anisolyl, and the like.

As used herein, the term "alkylaryl" refers to an aryl group substituted by the alkyl group.

As used herein, the term "arylalkyl" refers to an alkyl group substituted by the aryl group.

As used herein, the term "alkylsilyl" may be silyl substituted with alkyl having 1 to 20 carbon atoms, for example, may be trimethylsilyl or triethylsilyl.

As used herein, the term "alkylamino" refers to an amino group substituted by the alkyl group, and may include, but is not limited to, a dimethylamino group or a diethylamino group.

As used herein, the term "hydrocarbyl", unless otherwise stated, refers to a monovalent hydrocarbon group having 1 to 20 carbon atoms, which is composed only of carbon and hydrogen regardless of the structure thereof, such as alkyl, aryl, alkenyl, alkynyl, cycloalkyl, alkylaryl or arylalkyl.

More particularly, the hafnium compound represented by Formula 1 above may be a hafnium compound represented by Formula 1a or 1b below:

[Formula 1a]

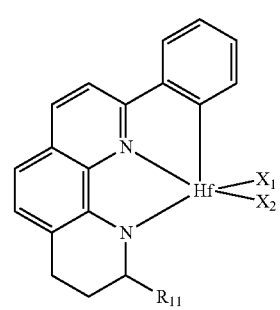

-continued

[Formula 1b]

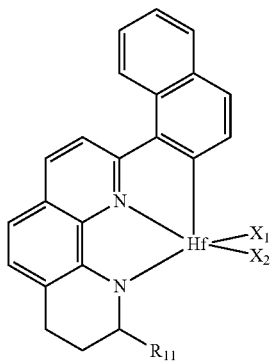

In Formulae 1a and 1b above, $R_{11}$ is hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio having 6 to 20 carbon atoms, an alkylsilyl group having 1 to 20 carbon atoms, or an arylsilyl group having 6 to 20 carbon atoms.

The hafnium compound may be represented by any one among Formulae 1-1 to 1-5 below, but is not limited thereto, and all the hafnium compounds corresponding to Formula 1 are included in the present invention.

[Formula 1-1]

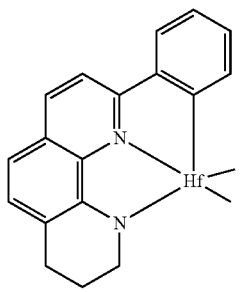

[Formula 1-2]

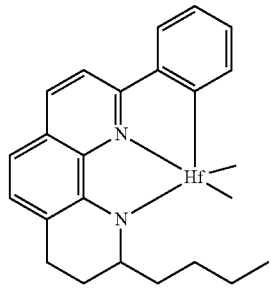

[Formula 1-3]

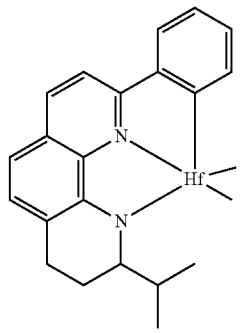

[Formula 1-4]

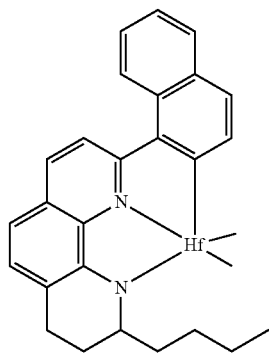

[Formula 1-5]

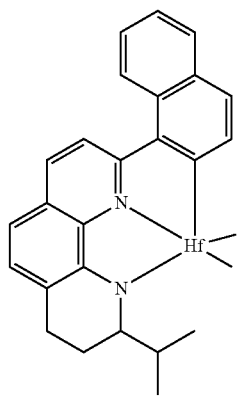

The hafnium compound of the present invention may be prepared by including the step of reacting a compound represented by Formula 2 below and a compound represented by Formula 3 below:

[Formula 2]

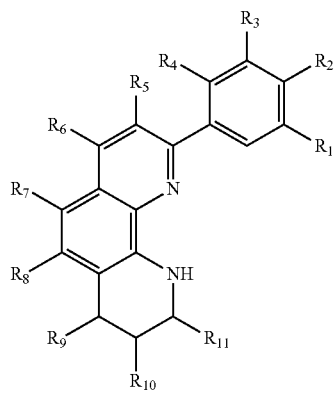

[Formula 3]

Hf(X$_1$X$_2$)$_2$

In Formulae above,

R$_1$ to R$_{11}$, and X$_1$ and X$_2$ are the same as defined above.

Meanwhile, when preparing the hafnium compound represented by Formula 1 above, the step of preparing the ligand compound may be performed differently according to the final structure of the prepared hafnium compound, as follows.

For example, when R$_3$ and R$_4$ do not form a ring and R$_{11}$ is a hydrogen atom in the ligand compound, the ligand compound may be prepared by hydrogenating under a ruthenium catalyst as follows, and then reacted with a compound represented by Formula 3, which is a hafnium precursor, to prepare a hafnium compound.

[Reaction Formula 1]

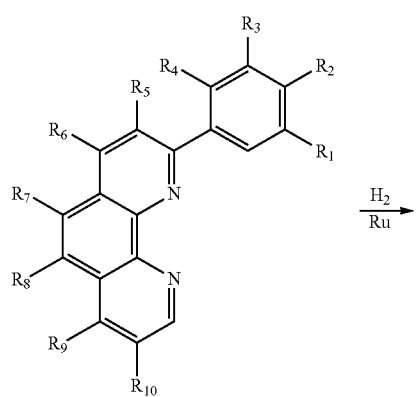

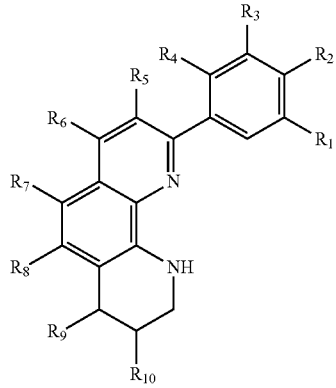

In addition, when R$_3$ and R$_4$ do not form a ring and R$_{11}$ is a substituent other than a hydrogen atom in the structure of the ligand compound, R$_{11}$ is first introduced using an organolithium compound and then hydrogenated under a ruthenium catalyst to prepare a ligand compound as shown in Reaction Formula 2 below:

[Reaction Formula 2]

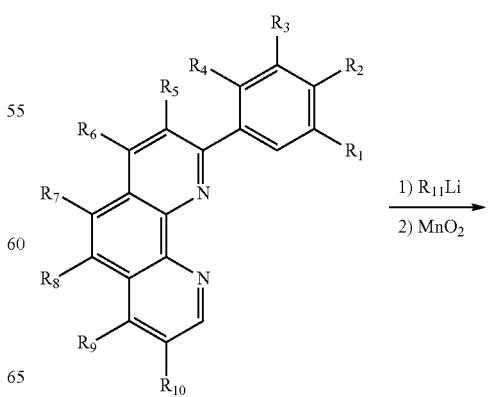

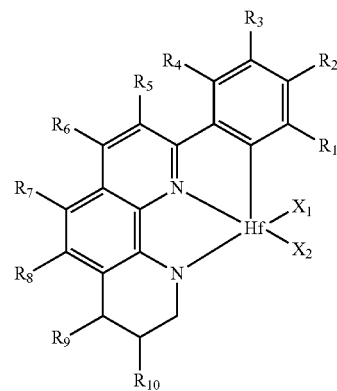

[Reaction Formula 3]

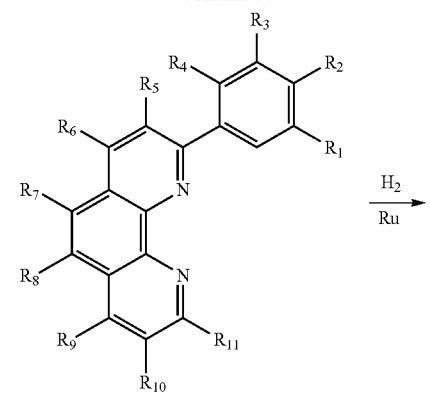

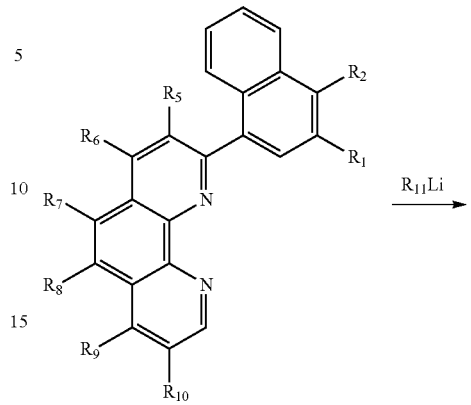

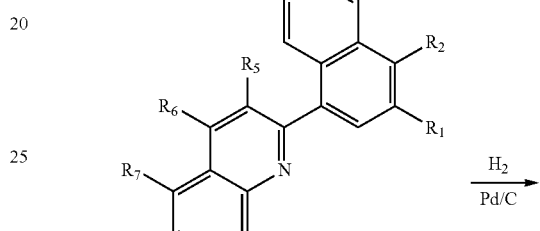

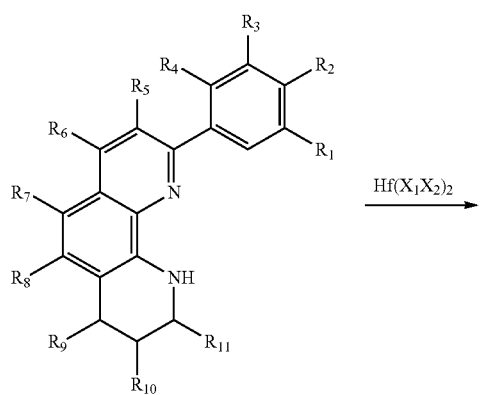

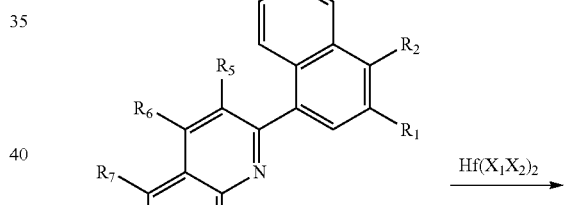

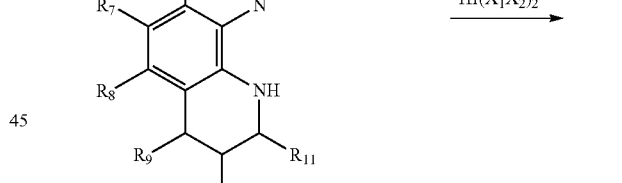

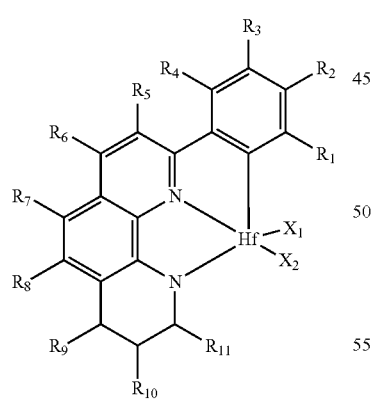

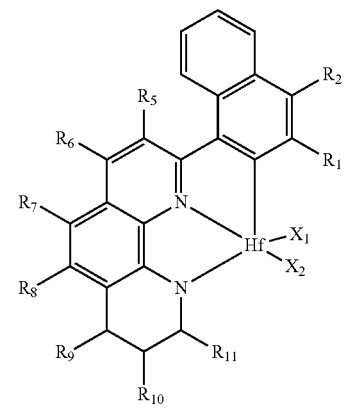

In addition, when $R_3$ and $R_4$ are bounded to each other to form an aromatic ring having 5 to 20 carbon atoms and $R_{11}$ is a substituent other than a hydrogen atom in the structure of the ligand compound, $R_{11}$ may be first introduced using an organolithium compound, and then the ligand compound may be prepared by hydrogenation under a Pd/C catalyst in order to prevent the hydrogenation of the aromatic ring such as a naphthyl group, as follows:

That is, the hafnium compound may be prepared by preparing a ligand compound by alkylation and hydrogenation under appropriate reagents and reaction conditions for the compound that is a precursor of the ligand compound and introducing hafnium thereto, and specific types of the alkylation reagent, reaction temperature, and pressure may be appropriately changed by those skilled in the art in consideration of the structure of the final compound and experimental conditions.

In the present invention, the organozinc compound is a substance used as a chain transfer agent to allow chain transfer to be performed during production in the polymerization to produce a copolymer, and particularly, may be a compound represented by Formula 4 below:

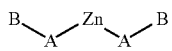 [Formula 4]

In Formula 4 above,

A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and B is arylene having 6 to 12 carbon atoms substituted with alkenyl having 2 to 12 carbon atoms.

In addition, A above may be alkylene having 1 to 12 carbon atoms, arylene having 6 to 12 carbon atoms, or arylene having 6 to 12 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and B above may be arylene having 6 to 12 carbon atoms substituted with alkenyl having 2 to 8 carbon atoms.

Formula 4 above may have a structure having double bonds at both ends thereof, for example, when B above is arylene substituted with alkenyl, the arylene may be connected to A above, and the double bond of the alkenyl substituted to the arylene may be located at the outermost portion in Formula 4 above.

When the organozinc compound is reacted with at least one type of olefin monomer in the presence of the catalyst composition, the polymerization may be effected while the olefin monomer is inserted between zinc (Zn) and the organic group (A) of the organozinc compound.

The organozinc compound may be mixed in an amount of 1 to 200 equivalents based on 1 equivalent of the transition metal compound of Formula 1 above, and particularly, may be mixed in an amount of 10 to 100 equivalents based on 1 equivalent of the transition metal compound of Formula 1 above.

The organozinc compound does not contain impurities such as THF and a large amount of magnesium salt, and thus can be provided in high purity, and therefore can be used as a chain transfer agent and is advantageous to be used in olefin polymerization.

The catalyst composition may further include a cocatalyst compound. In this case, the cocatalyst compound may serve to activate the transition metal compound represented by Formula 1, and any one known in the art may be used as a cocatalyst, for example, at least one selected from among Formulae 5 to 7 below may be used as the cocatalyst.

—[Al($R_a$)—O]$_m$— [Formula 5]

D($R_a$)$_3$ [Formula 6]

[L—H]$^+$[Z(A)$_4$]$^-$ or [L]$^+$[Z(A)$_4$]$^-$ [Formula 7]

In Formulae above, $R_a$ is each independently a halogen radical, a hydrocarbyl radical having 1 to 20 carbon atoms, or a hydrocarbyl radical having 1 to 20 carbon atoms substituted with halogen, m is an integer of 2 or more, D is aluminum or boron, L is a neutral or cationic Lewis acid, Z is a Group 13 element, A is each independently aryl having 6 to 20 carbon atoms, in which at least one hydrogen atom may be substituted with a substituent, or alkyl having 1 to 20 carbon atoms, and The substituent of A above is halogen, hydrocarbyl having 1 to 20 carbon atoms, alkoxy having 1 to 20 carbon atoms, or aryloxy having 6 to 20 carbon atoms.

The compound represented by Formula 5 above is not particularly limited as long as it is alkylaluminoxane. Preferred examples include methylaluminoxane, ethylaluminoxane, isobutylaluminoxane, butylaluminoxane, and the like, and particularly preferred compounds are methylaluminoxane.

The compound represented by Formula 6 above is not particularly limited, but preferred examples thereof include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and the like, and particularly preferred compounds are selected from among trimethylaluminum, triethylaluminum, and triisobutylaluminum.

For example, when Z is boron, examples of the compound represented by Formula 7 above may include, but are not limited to, dioctadecylmethylammonium tetrakis(pentafluorophenyl)borate [(C$_{18}$H$_{37}$)$_2$N(H)Me]$^+$[B(C$_6$F$_5$)$_4$]$^-$, dioctadecylmethylammonium tetrakis(phenyl)borate, dioctadecylmethylammonium tetrakis[3,5-bis(trifluoromethyl)phenyl]borate, triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, tripropylammonium tetra(p-tolyl)borate, triethylammonium tetra(o,p-dimethylphenyl)borate, trimethylammonium tetra(p-trifluoromethylphenyl)borate, triphenylcarbonium tetra(p-trifluoromethylphenyl)borate, triphenylcarbonium tetrapentafluorophenylborate, or a combination thereof, and for example, when Z is aluminum, examples of the compound may include, but are not limited to, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, or a combination thereof.

In particular, the cocatalyst used herein may be a compound represented by Formula 7 above, and particularly dioctadecylmethylammonium tetrakis(pentafluorophenyl)borate.

In addition, the cocatalyst used herein may be prepared in an anhydrous hydrocarbon solvent. For example, the hydrocarbon solvent may be at least one selected from the group consisting of butane, pentane, neopentane, hexane, cyclohexane, methylcyclohexane, heptane, octane, benzene, toluene, xylene and ethylbenzene, but is not limited thereto, and any hydrocarbon solvent available in the art may be used in an anhydrous form.

In the present invention, when the cocatalyst is prepared in the presence of an anhydrous hydrocarbon solvent, at least one peak appears each in the range of 1.75 ppm to 1.90 ppm and in the range of 1.90 ppm to 2.00 ppm in the $^1$H NMR spectrum. This is because protons attached to α-carbon adjacent to nitrogen, sulfur, or phosphorus included in L show different peaks. For example, when the compound represented by Formula 1 is $[(C_{18}H_{37})_2N(H)Me]^+[B(C_6F_5)_4]^-$, two protons present in $NCH_2$ may each show different signals in the $^1$H NMR spectrum thereof.

In addition, the hafnium compound represented by Formula 1 above and the cocatalyst may be used as supported on a carrier. Silica or alumina may be used as the carrier, but is not limited thereto.

Examples of the olefin monomer that is input as a reactant in the step (S1) may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, or a monomer formed of a mixture thereof. The olefin monomer may be used alone or in combination of two or more thereof.

The step (S1) may be performed, for example, in a homogeneous solution state. In this case, the hydrocarbon solvent may be used as a solvent or the olefin monomer itself may be used as a medium. Examples of the hydrocarbon solvent may include an aliphatic hydrocarbon solvent having 4 to 20 carbon atoms, and particularly, isobutane, hexane, cyclohexane, methylcyclohexane, or the like. The solvent may be used alone or in combination of two or more thereof.

The polymerization temperature of the step (S1) may vary depending on the reaction material, reaction conditions, etc., but particularly the polymerization may be carried out at 70° C. to 170° C., particularly, 80° C. to 150° C., or 90° C. to 120° C. Within this range, the catalyst may be thermally stable while increasing solubility of the polymer.

The polymerization of the step (S1) may be carried out in a batch, semi-continuous or continuous manner, or may be also carried out in two or more steps having different reaction conditions.

The compound prepared in the above-described step (S1) may serve as a precursor for producing the polyolefin-polystyrene multi-block copolymer of the present invention by the anionic polymerization reaction of the step (S2) described below.

Step (S2)

The step (S2) is a step of producing a polyolefin-polystyrene multi-block copolymer by forming a polystyrene block via anionic polymerization of the polyolefin block and the styrene monomer in the presence of the alkyl lithium compound containing a silicon atom and the triamine compound, followed by the step (S1).

In the step (S2), a styrene monomer may be continuously inserted between zinc-carbon bonds of (polyolefin)$_2$Zn contained in the compound formed in the above-described step (S1), and simultaneously, a styrene group at a terminal of the compound formed in the step (S1) may participate as a copolymerization site with the styrene monomer and be connected to a polystyrene chain. In addition, the end group of the multi-block copolymer produced through the process may react with water, oxygen, or an organic acid to be readily quenched, and thereby the multi-block copolymer is converted to a polyolefin-polystyrene multi-block copolymer that is industrially useful.

The styrene monomer may be a styrene monomer having 6 to 20 carbon atoms. More particularly, the styrene monomer, such as styrene may include ethylene substituted with an aryl group having 6 to 20 carbon atoms, ethylene substituted with a phenyl group, and the like.

The alkyl lithium compound containing a silicon atom may be a compound represented by Formula 8 below:

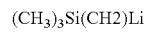    [Formula 8]

Such alkyl lithium compound containing a silicon atom is readily available as a material widely used as an initiator for the anionic polymerization and therefore is easily utilized in the present invention.

The triamine compound may be a compound represented by Formula 9 below:

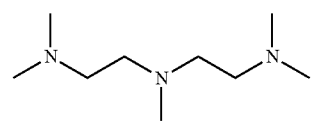

[Formula 9]

The triamine compound is readily available and inexpensive as a compound used for the purpose of improving reactivity of the alkyl lithium compound as a base or a nucleophile since the triamine compound is readily coordinated to lithium.

The present invention can maximize the generation of the polyolefin-polystyrene multi-block copolymer, which is the object of the present invention, while suppressing the production amount of polystyrene homopolymer, polyolefin homopolymer, polyolefin-polystyrene double block copolymer by newly using the compound of Formulae 8 and 9 above (for example, Me$_3$SiCH$_2$Li•(PMDETA)) as an initiator of the step (S2).

The alkyl lithium compound containing a silicon atom represented by Formula 8 above and the triamine compound represented by Formula 9 above may be mixed in an aliphatic hydrocarbon solvent and then added, or the alkyl lithium compound containing a silicon atom represented by Formula 8 above and the triamine compound represented by Formula 9 above may be sequentially added to a reactor.

The anionic polymerization temperature of the step (S2) may vary depending on the reaction material, reaction conditions, etc., and particularly, the polymerization may be carried out at 40° C. to 170° C., 60° C. to 150° C., or 90° C. to 100° C.

The anionic polymerization of the step (S2) may be carried out in a batch, semi-continuous or continuous manner, or may be also carried out in two or more steps having different reaction conditions.

The anionic polymerization time of the step (S2) may vary depending on the reaction material, reaction conditions, etc., and particularly may be 0.5-10 hours, 1-8 hours, 2-7 hours, or 4-6 hours. Within this range, it is advantageous to convert a total amount of styrene monomers to be introduced into multi-block copolymers.

Thus, in the production method of the present invention, a polyolefin-polystyrene multi-block copolymer is produced by a method of growing a polyolefin chain through olefin polymerization using the organozinc compound represented by Formula 4 and then continuously performing styrene anionic polymerization, thereby efficiently producing a polyolefin-polystyrene multi-block copolymer which has improved physical properties compared to the existing copolymer and is easily used in industrial application.

EXAMPLES

Hereinafter, the present invention will be described in more detail according to the examples. However, the following examples are intended to illustrate the present invention, and the scope of the present invention is not limited thereto.

Preparation of Transition Metal Compound

Manufacturing Example 1

(i) Preparation of Ligand Compound

Figure 1B:
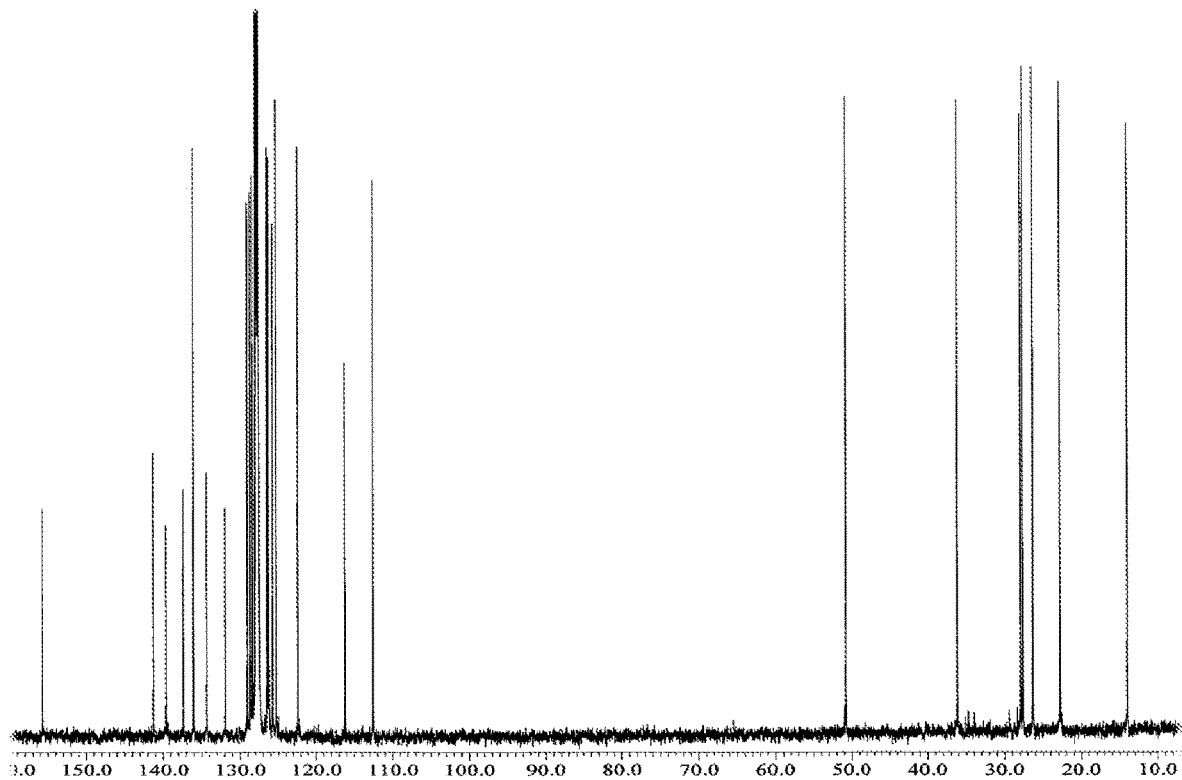
FIG. 1B shows a $^{13}$C NMR spectrum of a ligand compound according to an embodiment of the present invention.

Isopropyl lithium (0.45 mL, 0.36 mmol, 0.79 M in pentane) was slowly added to 2-naphthyl-1,10-phenanthroline (0.789 g, 2.58 mmol) in toluene (8 mL) at −10° C. After stirring at room temperature for 3 hours, degassed $H_2O$ (3 mL) was added thereto. The aqueous layer was removed with a syringe under $N_2$. The solvent was removed using a vacuum line and the residue was dissolved in degassed ethanol (15 mL) and THF (5 mL). The solution was transferred to a bomb reactor containing Pd/C (0.242 mmol, 10 mol %) under $N_2$. $H_2$ gas was charged to 5 bar and then stirred at room temperature for 12 hours. The $H_2$ gas was released and the catalyst residue was removed by filtration over celite. The solvent was removed and the residue was purified by silica gel column chromatography using ethyl acetate/hexane (1/3, v/v). A light yellow sticky solid was obtained (0.085 g, 73%). The $^1H$ NMR and $^{13}C$ NMR spectra are shown in FIGS. 1A-B.

$^1H$ NMR ($C_6D_6$): δ 8.58 (d, J=7.8 Hz, H), 7.75 (d, J=9.0 Hz, H), 7.70 (d, J=9.6 Hz, H), 7.66 (d, J=7.2 Hz, H), 7.63 (d, J=6.6 Hz, H), 7.32 (m, 4H), 7.18 (d, J=8.4 Hz, H), 6.99 (d, J=7.8 Hz, H), 6.39 (s, H, NH), 2.93 (m, H), 2.79 (m, H), 2.70 (dt, J=4.8 Hz, H), 1.70 (m, H), 1.63 (m, H), 1.47 (m, H), 0.81 (d, J=7.2 Hz, 3H, $CH(CH_3)_2$), 0.76 (d, J=7.2 Hz, 3H, $CH(CH_3)_2$) ppm.

$^{13}C\{^1H\}$ NMR ($C_6D_6$): δ 18.34, 18.77, 24.43, 26.78, 32.52, 56.73, 112.78, 116.67, 122.62, 125.59, 126.10, 126.51, 126.61, 126.86, 128.14, 128.69, 129.03, 129.28, 132.20, 134.71, 136.41, 137.64, 139.79, 141.75, 155.92 ppm.

m/z calcd([M$^+$] $C_{25}H_{24}N_2$) 352.4800. Found: 352.1942.

(ii) Preparation of Transition Metal Compound

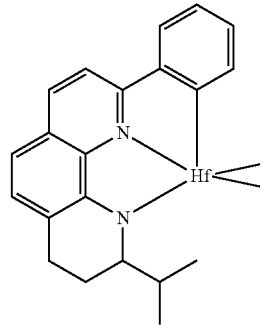

[Formula 1-3]

Figure 2A:
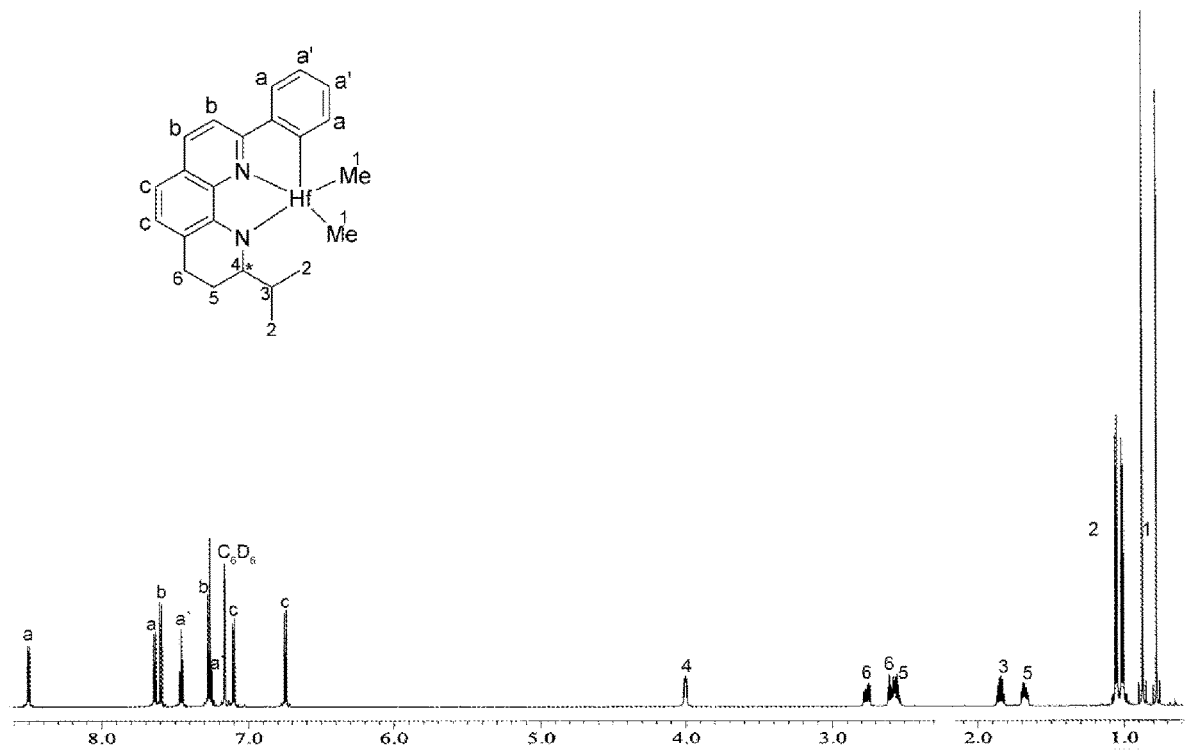
FIG. 2A shows an $^1$H NMR spectrum of a transition metal compound according to an embodiment of the present invention.
Figure 2B:
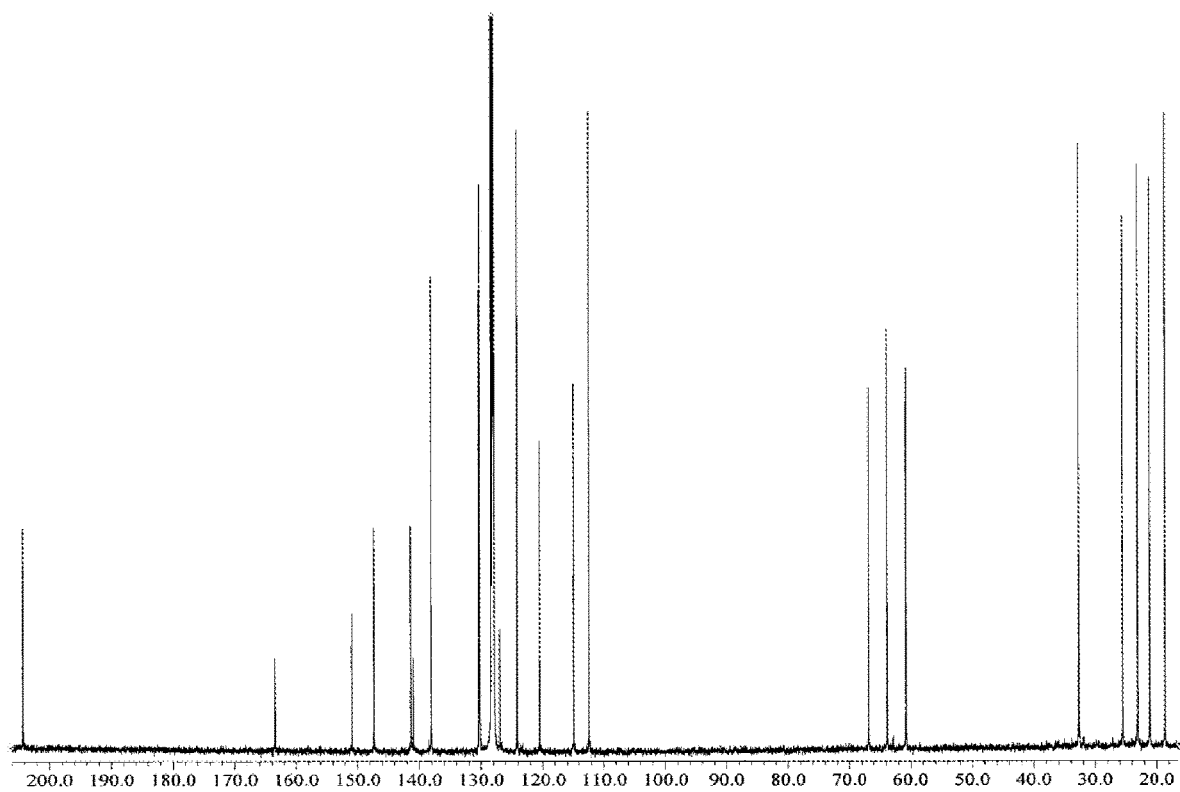
FIG. 2B shows a $^{13}$C NMR spectrum of a transition metal compound according to an embodiment of the present invention.
Figure 3:
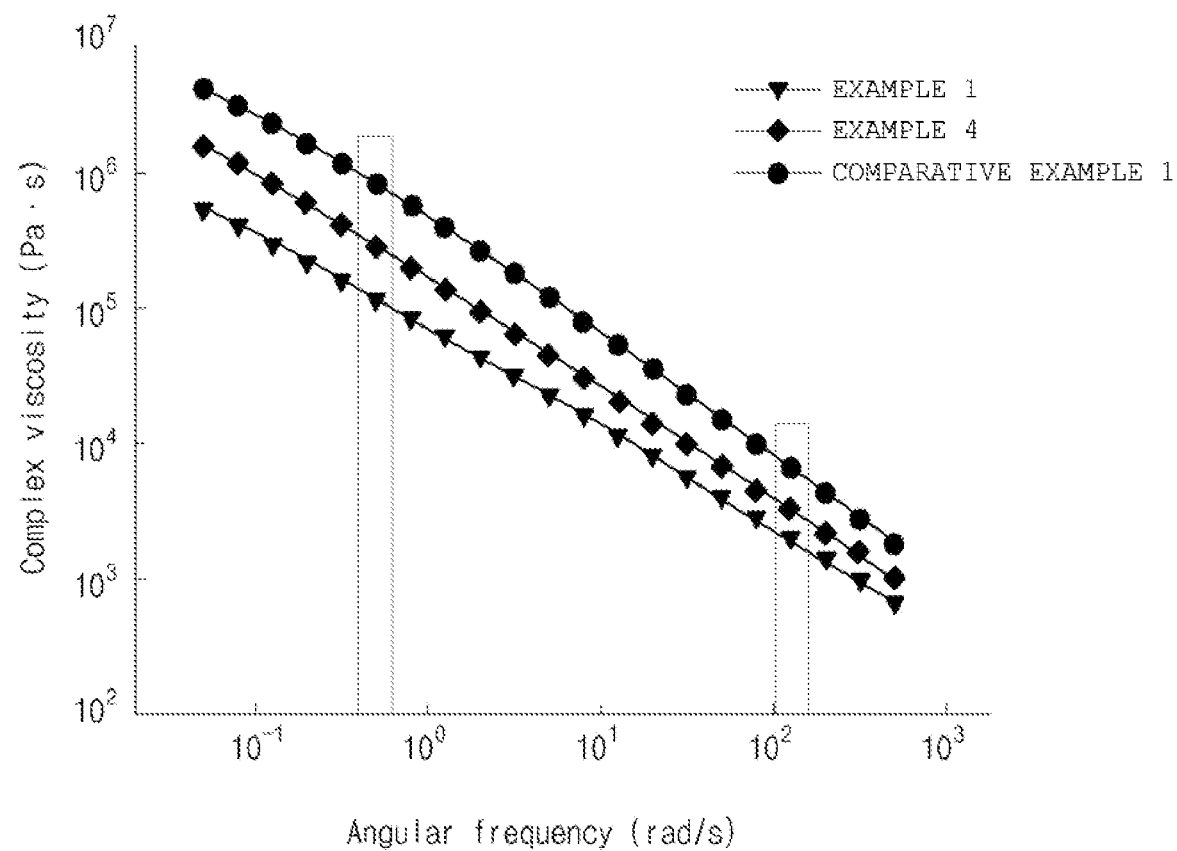
FIG. 3 is a graph illustrating complex viscosity versus frequency of a polyolefin-polystyrene multi-block copolymer according to an embodiment of the present invention.

MeMgBr (1.24 mL, 3.11 M in diethyl ether) was added dropwise to a stirred suspension of HfCl$_4$(0.300 g, 0.938 mmol) in toluene (8 mL) at −78° C. After stirring for 1 hour within the temperature range of −40° C. to −35° C., the solution was cooled again to −78° C. A solution (0.24 g, 0.94 mmol) of the ligand compound (0.366 g, 1.00 mmol) in toluene (4 mL) was added dropwise thereto. The resulting solution was stirred at a controlled temperature within the range of −40° C. to −35° C. for 2 hours, and then stirred at room temperature overnight. The solvent was removed using a vacuum line and the residue was extracted with toluene (50 mL). Dark brown powder was obtained by milling in hexane (0.226 g, 47%). The $^1H$ NMR and $^{13}C$ NMR spectra are shown in FIGS. 2A-B.

$^1H$ NMR ($C_6D_6$): δ8.66 (d, J=7.8 Hz, H), 8.50 (d, J=7.8 Hz, H), 7.92 (d, J=9.0 Hz, H), 7.83 (d, J=7.2 Hz, H), 7.76 (d, J=8.4 Hz, H), 7.62 (d, J=7.8 Hz, H), 7.40 (td, J=7.2 Hz, H), 7.32 (m, H), 7.14 (d, J=7.8 Hz, H), 6.77 (d, J=7.2 Hz, H), 4.02 (m, H), 2.80 (m, H), 2.62 (dt, J=6.0 Hz, H), 2.55 (m, H), 1.88 (m, H), 1.72 (m, H), 1.09 and 1.04 (d, J=6.6 Hz, 6H, $CH(CH_3)_2$), 0.82 (s, 3H, HfCH$_3$), 0.81 (s, 3H, HfCH$_3$) ppm.

$^{13}C\{^1H\}$ NMR ($C_6D_6$): δ 18.55, 21.28, 23.07, 25.44, 32.58, 60.98, 63.06, 66.88, 112.37, 119.64, 120.21, 124.55, 125.48, 126.81, 126.97, 129.31, 129.97, 130.26, 131.25, 133.82, 135.51, 140.97, 141.44, 143.94, 150.14, 164.58, 209.13 ppm.

Anal. Calcd. ($C_{27}H_{28}HfN_2$): C, 58.01; H, 5.05; N, 5.01%. Found: C, 57.91; H, 5.01; N, 5.11%.

Preparation of Cocatalyst

Excess K$^+$[B($C_6F_5$)$_4$]$^-$ (0.633 g, 0.881 mmol, assuming pure) was reacted with a solution of [($C_{18}H_{37}$)$_2$N(H)Me]$^+$[Cl]$^-$ (0.404 g, 0.705 mmol) in toluene (anhydrous, 10 mL) for 1 hour at room temperature in a glove box. After filtering over celite, the solvent was removed using a vacuum line. The residue was dissolved in methylcyclohexane (4 mL) and filtered again over celite. The solvent was removed to produce a yellow oily compound, which was used without further purification (0.797 g, 93%).

$^1$H NMR (C$_6$D$_6$): δ 3.15 (br, H, NH), 1.97 (m, 2H, NCH$_2$), 1.80 (m, H, NCH$_2$), 1.51 (d, J=6.0 Hz, 3H, NCH$_3$), 1.45-1.29 (m, 48H), 1.26 (quintet, J=7.2 Hz, 4H), 1.13 (quintet, J=7.2 Hz, 4H), 0.94 (t, J=7.8 Hz, 6H), 0.88 (quintet, J=7.8 Hz, 4H), 0.81 (m, 4H) ppm.

$^{19}$F NMR (C$_6$D$_6$): δ −132.09, −161.75, −165.98.

Preparation of Organozinc Compound

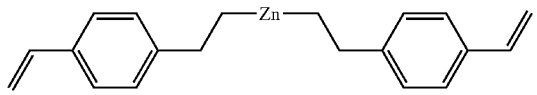

Borane dimethyl sulfide (1.6 mL, 3.2 mmol) was slowly added to triethylborane (0.6 g) under stirring and reacted for 90 minutes. The mixture was slowly added to divinylbenzene (3.8 g) dissolved in anhydrous diethyl ether (10 mL) cooled to −20° C. The solvent was removed with a vacuum pump, and diethyl zinc (0.8 g) was added thereto. The reaction was carried out while the resulting triethylborane was removed by distillation under reduced pressure at 0° C. for 5 hours. Excessive amount of divinylbenzene and diethylzinc was removed by distillation under reduced pressure at 40° C. After dissolving the product again by adding methylcyclohexane (150 mL), a solid compound produced as a byproduct was filtered and removed by using celite to produce an organozinc compound represented by Formula above.

Preparation of Polyolefin-Polystyrene Multi-Block Copolymer

Example 1

A Parr reactor (600 mL) was vacuum-dried at 120° C. for 2 hours. A solution of Oc$_3$Al (349.0 mg, 238 μmol-Al) in methylcyclohexane (200 g) was added to the reactor. The mixture was stirred at 120° C. for 1 hour using a mantle and then the solution was removed using a cannula.

The reactor was filled with methylcyclohexane (200 g) containing Oc$_3$Al (349.0 mg, 238 μmol-Al/25 wt % in hexane) as a scavenger, and then the temperature was set to 90° C. 60 mL of 1-hexane was injected thereto. A solution of the organozinc compound (624 μmol), as a chain transfer agent, in methylcyclohexane (1.58 g) was filled, and then a solution of methylcyclohexane (2.33 g) containing the transition metal compound (10.0 μmol-Hf) of Preparation Example 1 above activated with [(C$_{18}$H$_{37}$)$_2$N(H)Me]$^+$[B(C$_6$F$_5$)$_4$]$^-$ (1.0 eq) in methylcyclohexane was injected. The polymerization was carried out for 40 minutes while the valve of the ethylene tank was opened to maintain the pressure in the reactor at 20 bar. The temperature was controlled within the range of 90-120° C. and the remainder of ethylene gas was discharged.

When the temperature reached 90° C., a solution of Me$_3$SiCH$_2$Li (PMDETA) prepared by mixing Me$_3$SiCH$_2$Li (64.6 mg, 0.686 mmol) and PMDETA (130.7 mg, 0.755 mmol) with methylcyclohexane (3.85 g) was added. While stirring, the temperature was maintained at 90° C. for 30 minutes, and then styrene (12.5 g) was injected. The temperature was controlled in the range of 90-100° C. using the heating jacket.

Viscosity was gradually increased to almost reach an invisible state within 5 hours. The $^1$H NMR analysis of the aliquot confirmed that the styrene was completely converted. After complete conversion of the styrene, 2-ethylhexanoic acid and ethanol were continuously injected. The resulting polymer mass (29 g) was dried in a vacuum oven at 80° C. overnight.

Examples 2 to 8

Examples 2 to 8 was prepared in the same manner as in Example 1 above except that the reaction conditions were changed as shown in Table 1 below.

Comparative Examples 1 and 2

As commercially available SEBS, G1650 and G1652 from Kraton Inc. were used, respectively.

Comparative Example 3

[Comparative Formula 1]

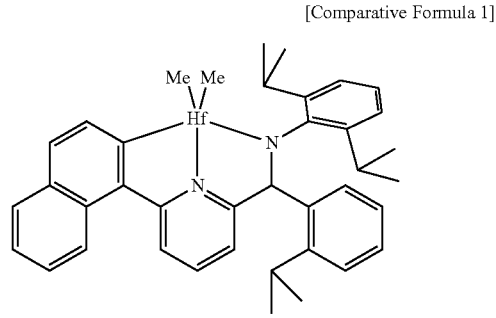

Comparative Example 3 was prepared as follows by using the compound represented by the above formula as a transition metal compound:

A bomb reactor (125 mL) was emptied at 60° C. for 1 hour. After being filled with ethylene gas at atmospheric pressure, a solution of Me$_3$Al (28.8 mg, 200 μmol-Al) in methylcyclohexane (15.5 g) was added to the reactor. The mixture was stirred at 100° C. for 1 hour using a mantle and then the solution was removed using a cannula. The reactor was emptied again to remove the remaining solvent, and refilled with ethylene gas at atmospheric pressure. The catalyst poisoning was purified through this procedure.

The reactor was filled with methylcyclohexane (15.5 g) containing MMAO (20 mg, 50 μmol-Al, 6.7 wt %-Al in heptane, from AkzoNobel) as a scavenger, and then the temperature was set to 80° C. A solution of (octyl)$_2$Zn (100 μmol), as a chain transfer agent, in methylcyclohexane (10.0 g) was filled therein, and then a solution of methylcyclohexane (0.30 g) containing the transition metal compound (2.0 μmol-Hf) activated with [(C$_{18}$H$_{37}$)$_2$N(H)Me]$^+$[B(C$_6$F$_5$)$_4$]$^-$ (1.0 eq) in benzene was injected thereto. An ethylene/propylene gas mixture (10 bar/10 bar, total 20 bar) was filled from a tank to the reactor at 20 bar, and the polymerization was carried out for 50 minutes. The temperature was controlled within the range of 80-90° C. and the remainder of ethylene/propylene gas mixture was discharged.

When the temperature reached 90° C., a solution of Me$_3$SiCH$_2$Li (PMDETA) prepared by mixing Me$_3$SiCH$_2$Li (11.3 mg, 0.120 mmol) and PMDETA (20.8 mg, 0.120 mmol) with methylcyclohexane (1.0 g) was added. While stirring, the temperature was maintained at 90° C. for 30 minutes, and then styrene (7.8 g, 750 mmol) was injected thereto. The temperature was controlled in the range of 100-110° C. using the mantle. Viscosity was gradually increased to almost reach an invisible state within 5 hours. The $^1$H NMR analysis of the aliquot confirmed that the styrene was completely converted. After complete conversion of the styrene, acetic acid and ethanol were continuously injected thereto. The resulting polymer mass (24.7 g) was dried in a vacuum oven at 160° C. overnight. The polymer (3.0 g) was dissolved in chloroform (30.0 g) at 60° C., and then acetone (60.0 g) was added to precipitate the block copolymer.

(2) Weight Average Molecular Weight (Mw, g/mol) and Molecular Weight Distribution (Polydispersity Index, PDI)

The weight average molecular weight (Mw, g/mol) and number average molecular weight (Mn, g/mol) were each measured using gel permeation chromatography (GPC), and the molecular weight distribution (polydispersity index, PDI) was calculated by dividing the weight average molecular weight with the number average molecular weight.

Column: PL Olexis
Solvent: TCB (trichlorobenzene)
Flow rate: 1.0 ml/min
Sample concentration: 1.0 mg/ml

TABLE 1

|  | Catalyst type | Feeding amount of catalyst (μmol) | Feeding amount of cocatalyst (μmol) | Alpha olefin Type | Alpha olefin Feeding amount | Polymerization pressure (ethylene) (bar) |
|---|---|---|---|---|---|---|
| Example 1 | Formula 1-3 | 10 | 10 | 1-hexene | 60 mL | 20 |
| Example 2 | Formula 1-3 | 10 | 10 | 1-hexene | 50 | 20 |
| Example 3 | Formula 1-3 | 5 | 5 | 1-hexene | 70 | 20 |
| Example 4 | Formula 1-3 | 3 | 3 | 1-hexene | 70 | 20 |
| Example 5 | Formula 1-3 | 4 | 4 | 1-hexene | 75 | 20 |
| Example 6 | Formula 1-3 | 5 | 5 | 1-hexene | 75 | 20 |
| Example 7 | Formula 1-3 | 5 | 5 | 1-hexene | 75 | 10 |
| Example 8 | Formula 1-3 | 5 | 5 | 1-hexene | 50 | 10 |
| Comparative Example 1 |  |  |  | G1650 |  |  |
| Comparative Example 2 |  |  |  | G1652 |  |  |
| Comparative Example 3 | Comparative Formula 1 | 2 | 2 | 1-Propylene | 10 bar | 20 |

Experimental Example 1

With respect to the polyolefin-polystyrene multi-block copolymers of Examples and Comparative Examples, physical properties of each of the copolymers were determined according to the following conditions and methods, and the results are shown in Table 2.

(1) Determination of Content of Ethylene, Alpha-Olefin and Styrene

The content was determined through NMR. After $^1$H NMR was determined under conditions of ns=16, d1=3s, solvent=TCE-d2, and 373K using Bruker 600 MHz AVANCE III HD NMR equipment, the peak of the TCE-d2 solvent was calibrated to 6.0 ppm, and $CH_3$ of 1-propylene at 1 ppm and the $CH_3$-related peak (triplet) of butyl-branch by 1-hexene near 0.96 ppm were identified, and then the content was calculated. In addition, the content of styrene was calculated with the aromatic peak near 6.5 ppm to 7.5 ppm.

Injection amount: 200 μL
Column temperature: 160° C.
Detector: Agilent High Temperature RI detector
Standard: Polystyrene
Calculation of molecular weight by universal calibration using Mark-Houwink equation (K=40.8×10$^{-5}$, α=0.7057)

3) Complex Viscosity

The complex viscosity was measured by using Advanced Rheometric Expansion System (ARES) from TA instruments. The sample was made to have a gap of 2.0 mm by using parallel plates of 25.0 mm in diameter at 160° C. The measurement was carried out in dynamic strain frequency sweep mode at a strain of 5% at a frequency from 0.05 rad/s to 500 rad/s, with 10 points per decade for a total of 41 point frequencies.

The complex viscosities at a frequency of 0.5 rad/s and 125 rad/s are summarized and listed in Table 2 below.

TABLE 2

| | Olefin monomer composition | | | GPC | | Complex Viscosity | |
|---|---|---|---|---|---|---|---|
| | Ethylene (wt %) | Alpha-olefin (wt %) | Styrene (wt %) | Mw (g/mol) | PDI | 0.5 (rad/s) | 125 (rad/s) |
| Example 1 | 45.9 | 44.2 | 17.7 | 78,722 | 1.77 | 46,130.9 | 1,316.74 |
| Example 2 | 49.1 | 34.0 | 25.5 | 98,042 | 1.87 | 166,821 | 2,102.35 |
| Example 3 | 43.8 | 40.7 | 26.2 | 93,990 | 1.66 | 148,129 | 2,190.63 |
| Example 4 | 47.0 | 34.8 | 27.9 | 107,403 | 1.64 | 287,815 | 3,190.29 |
| Example 5 | 45.7 | 34.4 | 30.3 | 90,996 | 1.76 | 163,142 | 2,350.77 |
| Example 6 | 46.7 | 36.1 | 26.9 | 81,443 | 1.74 | 71,963.3 | 1,293.83 |
| Example 7 | 37.1 | 52.1 | 22.6 | 101,561 | 1.86 | 54,858.3 | 1,100.57 |
| Example 8 | 38.9 | 41.4 | 33.6 | 74,684 | 1.71 | 59,033.6 | 1,339.43 |
| Comparative Example 1 | 44.3 | 26.2 | 29.5 | 54,600 | 1.1 | 830,596 | 6538.66 |
| Comparative Example 2 | 44.6 | 26.6 | 28.8 | 44,100 | 1.1 | 196,084 | 5001.26 |
| Comparative Example 3 | 34.1 | 24.2 | 41.7 | 111,197 | 1.76 | 1,242,295 | 11,024.54 |

It was seen that the copolymer prepared by the present invention exhibited a low complex viscosity at a high frequency region, in particular, a frequency of 125 rad/s, compared to the commercially available copolymers in Comparative Examples 1 and 2 and the copolymer prepared by using a conventional transition metal compound as a catalyst in Comparative Examples 3.

Therefore, it was confirmed that the polyolefin-polystyrene multi-block copolymer satisfying the conditions (a) and (b) according to the present invention exhibited excellent processability.

The invention claimed is:

1. A polyolefin-polystyrene multi-block copolymer satisfying conditions (a) and (b) below:
   (a) a first complex viscosity of 40,000 Pa·s to 350,000 Pa·s at a temperature of 160° C. and a first frequency of 0.5 rad/s; and
   (b) a second complex viscosity of 900 Pa·s to 3,500 Pa·s at a temperature of 160° C. and a second frequency of 125 rad/s.

2. The polyolefin-polystyrene multi-block copolymer of claim 1, wherein the first complex viscosity is 45,000 Pa·s to 300,000 Pa·s, and the second complex viscosity is 1,000 Pa·s to 3,300 Pa·s.

3. The polyolefin-polystyrene multi-block copolymer of claim 1, which has a weight average molecular weight of 50,000 g/mol to 150,000 g/mol.

4. The polyolefin-polystyrene multi-block copolymer of claim 1, which has a molecular weight distribution of 1.5 to 3.0.

5. The polyolefin-polystyrene multi-block copolymer of claim 1, wherein the polyolefin-polystyrene multi-block copolymer is at least one selected from the group consisting of a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer, and a polystyrene-poly(ethylene-co-1-octene)-polystyrene block copolymer.

* * * * *